INVENTOR
CARL W. WEILAND
BY Cushman, Darby & Cushman
ATTORNEYS

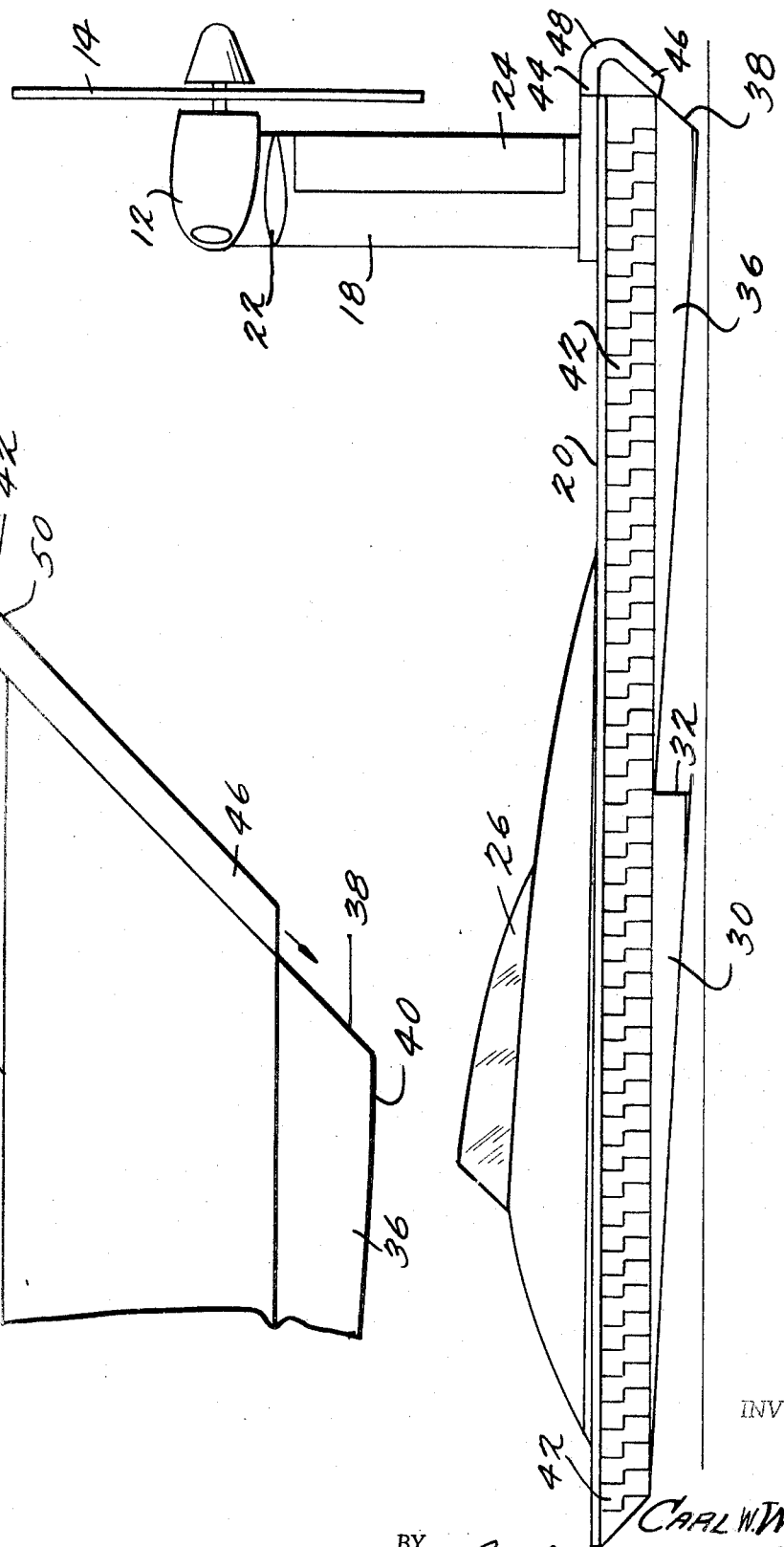

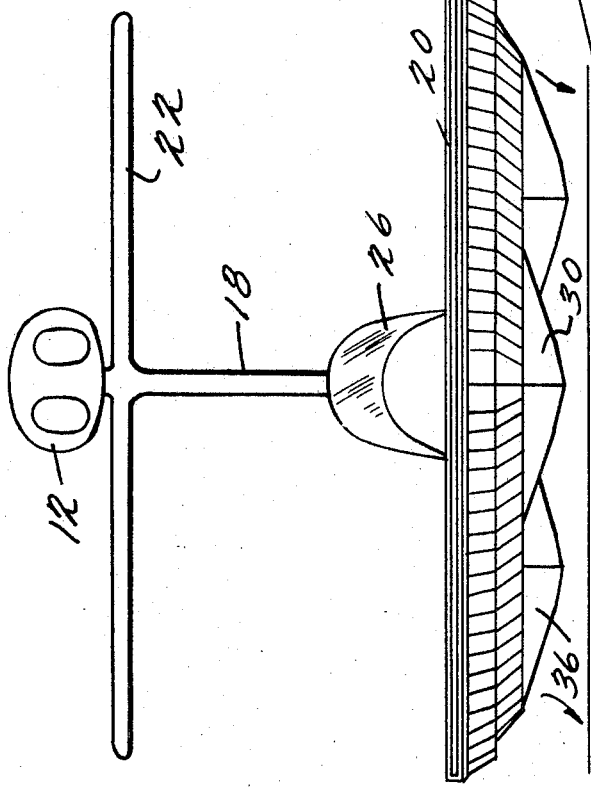
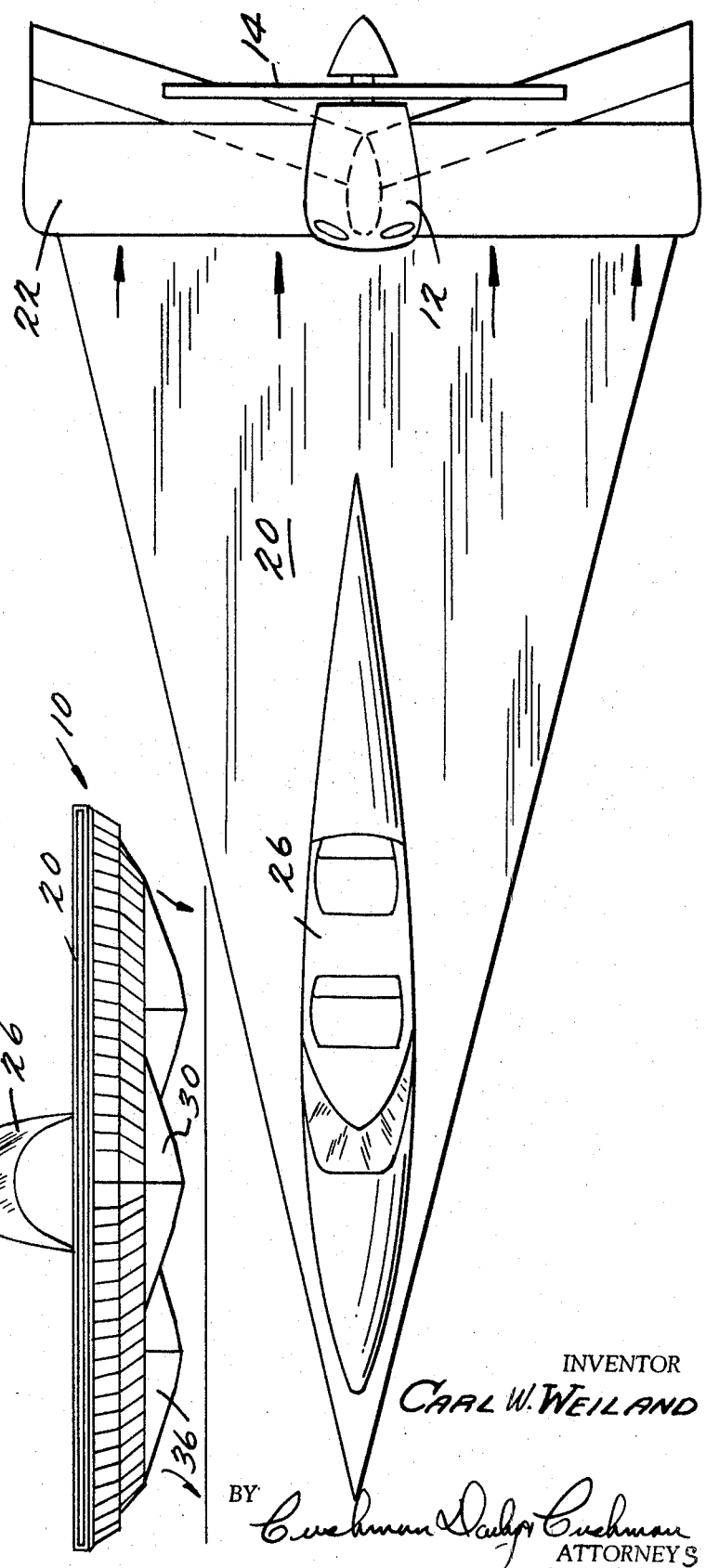

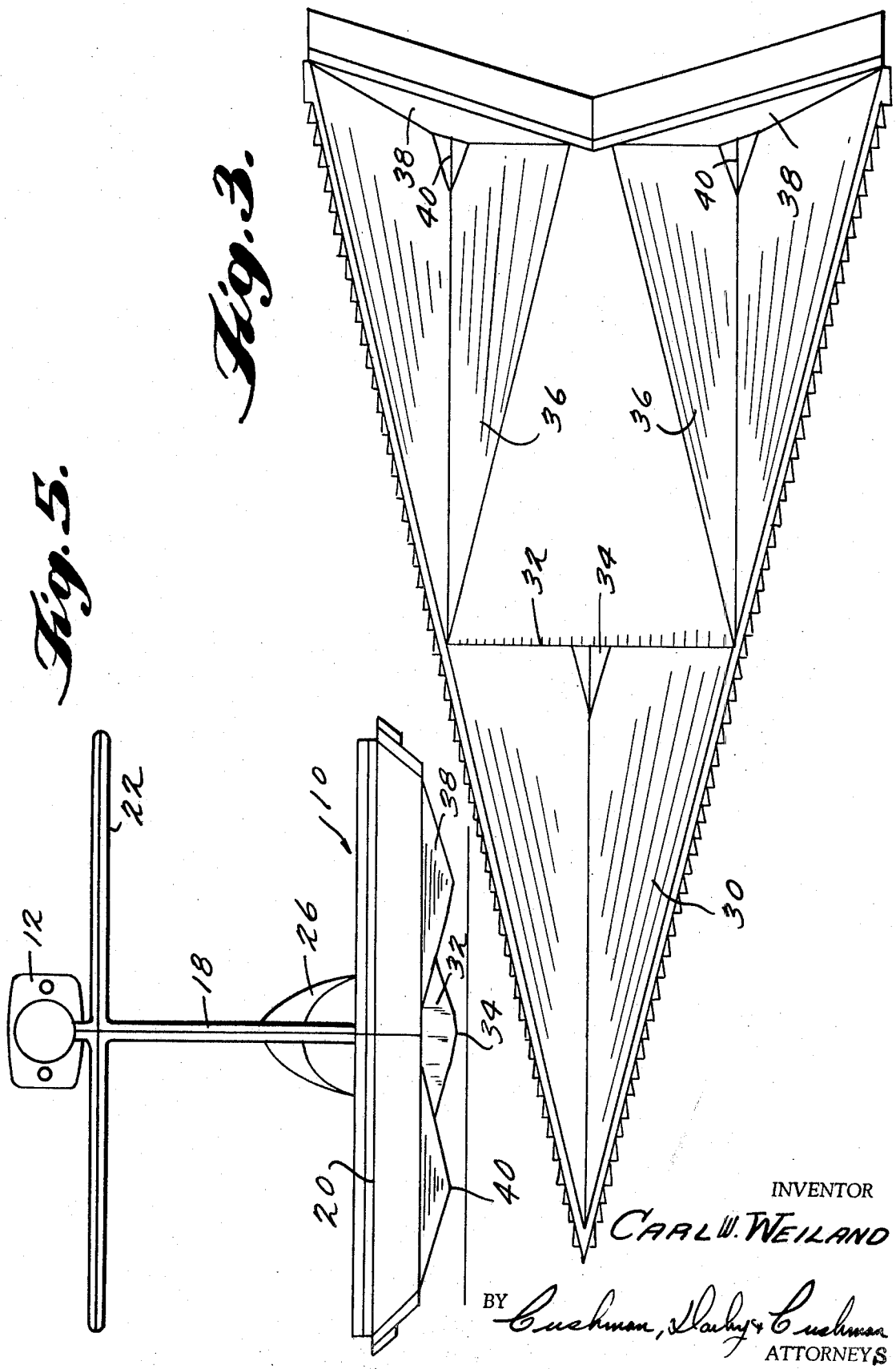

United States Patent Office 3,515,236
Patented June 2, 1970

3,515,236
APPARATUS FOR PROVIDING AN AIR CUSHION
FOR A GROUND EFFECT VEHICLE
Carl W. Weiland, 2980 Interlaken,
Orchard Lake, Mich. 48033
Filed Mar. 4, 1968, Ser. No. 710,021
Int. Cl. B60v 1/02, 1/08
U.S. Cl. 180—117                                   8 Claims

ABSTRACT OF THE DISCLOSURE

An air cushion for a ground effect vehicle is dynamically induced and provided, without supplementary power, by utilizing the forward movement of the vehicle to scoop up relatively-moving ambient air and directing the moving air to form a downwardly and inwardly directed curtain extending along at least a portion of the periphery of the vehicle. Preferably a plurality of scoops, curtain-forming nozzles and unobstructed ducts connecting each scoop with a nozzle are arranged about the periphery of the vehicle.

BACKGROUND AND BRIEF DESCRIPTION OF THE INVENTION

This invention generally relates to a method and apparatus for supporting a moving vehicle. The invention employs the ground effect machine (GEM) principle, but does not rely on supplementary power, i.e. a power-driven fan or blower, to create a supporting cushion of air for the vehicle. Although the principles of this invention are applicable to various types of vehicles, they are particularly applicable to speedboats and, hence, will be described in connection therewith.

In the past, the GEM principle has been successfully applied to land, aquatic, and amphibious vehicles, but has not been too successful in its application to a speedboat because the latter would be too expensive and mechanically complex. A speedboat desirably should be designed to be operative and maintained as simply and inexpensively as possible. The advantages of utilizing the GEM principle in a speedboat are obvious, i.e. reduced friction, etc., but in the past successful utilization has been deterred because of two important drawbacks. First, the boats were compelled to use a power-driven fan or blower in order to create an air cushion. The presence of a heavy fan, together with its bulky associated apparatus and supplemental power, not only undesirably increased the weight of the boat but also rendered it difficult to properly streamline the boat, with resulting lower speeds and less efficient operation. Secondly, the mass of air moved by the fan had to be conveyed to the outlet nozzles by lengthy and voluminous ducts, thus further adding to the weight and complexity of the boat and also detracting from its most desirable streamline characteristics. Moreover, the elongated air ducts were rather expensive, thus further increasing the already excessive cost of the boat.

It is apparent therefore, that previous attempts to solve the problem of designing a feasible GEM speedboat have been less than fully successful, because of the necessity of a power-driven fan to create an air cushion.

On the other hand, the present invention effectively solves the problem of providing a GEM speedboat in which the aforementioned drawbacks have been eliminated. The invention not only eliminates the necessity of a power-driven fan, but also eliminates lengthy, voluminous air ducts.

A brief description of the method and apparatus for applying the invention to a speedboat follows:

The speedboat has a hull of a generally triangular configuration, with the stern portion having the shape of an indented V, as viewed from above. The buoyant hull of the boat preferably is provided with three steps, one forward at approximately the mid-center of the craft, and a laterally-spaced pair at the aft end. A propulsion means preferably is mounted on the rear deck in the form of an engine-driven air propeller. An air rudder and a horizontal vertical stabilizer are also provided. If desired, a water rudder could be coupled to the air rudder in order to provide more effective directional control while traveling at low speed.

The aforementioned curtain of air is formed by a plurality of forwardly-facing air scoops arranged in laterally adjacent relation at approximately deck level, about the periphery of the boat. Each of the scoops is adapted to gather a mass of air and to channel it through an unobstructed duct to an elongated curtain-forming nozzle which extends downwardly and inwardly of the boat adjacent the periphery of its bottom. Each of the side air scoops is approximately level with the deck of the boat, while each corresponding nozzle is substantially adjacent the undersurface of the hull. Each of the ducts preferably includes a plurality of air-deflecting vanes, for smoothly redirecting the collected air mass downwardly to the corresponding nozzle.

In operation, forward movement is imparted to the vehicle by the air propeller and as the boat gains speed the steps on the undersurface of the hull raise the boat in the water. When the boat has attained a given speed, the velocity and mass of air emitted by the curtain-forming nozzles becomes sufficient to develop and seal, in known manner, a cushion of air beneath the hull at a pressure sufficient to support the hull above the water.

While the invention is primarily intended to be employed in a high-speed aquatic vehicle, such as a speedboat of the type described, it is evident that the basic concept is equally applicable to a water vehicle of the type disclosed, for example, in U.S. Pats. Nos. 3,027,860 and 3,205,847, wherein the air cushion is sealed at the sides of the vehicle by vanes or skegs which depend into the water. In this case, at least one forwardly-facing air scoop and unobstructed duct means would deliver air beneath the hull, without the necessity of a power-driven fan or blower.

It is apparent therefore, that the present invention embodies a speedboat design which effectively exploits the GEM concept in a simple inexpensive manner. The boat is simply designed and has an advantageous streamline. It is easy to operate and maintain, due to the absence of a power-driven fan and lengthy and voluminous air ducts. Moreover, a smooth ride at high speed is ensured by the dynamically produced air cushion. Finally the water vehicle is much less expensive in design and operation than previous versions utilizing the GEM concept.

In addition to the advantages mentioned above, other advantages will become apparent from the following more detailed description of the invention and accompanying drawings, in which:

FIG. 1 is a side view of a speedboat embodying this invention elevated above the water;

FIG. 2 is a top plan view of the boat shown in FIG. 1;

FIG. 3 is a bottom plan view of the boat shown in FIG. 1;

FIG. 4 is a front view of the boat shown in FIG. 1;

FIG. 5 is a rear view of the boat shown in FIG. 1;

FIG. 10 is a side, part-sectional view of one of the stern air scoops together with the associated duct and nozzle.

DETAILED DESCRIPTION OF THE INVENTION

Figure 6:
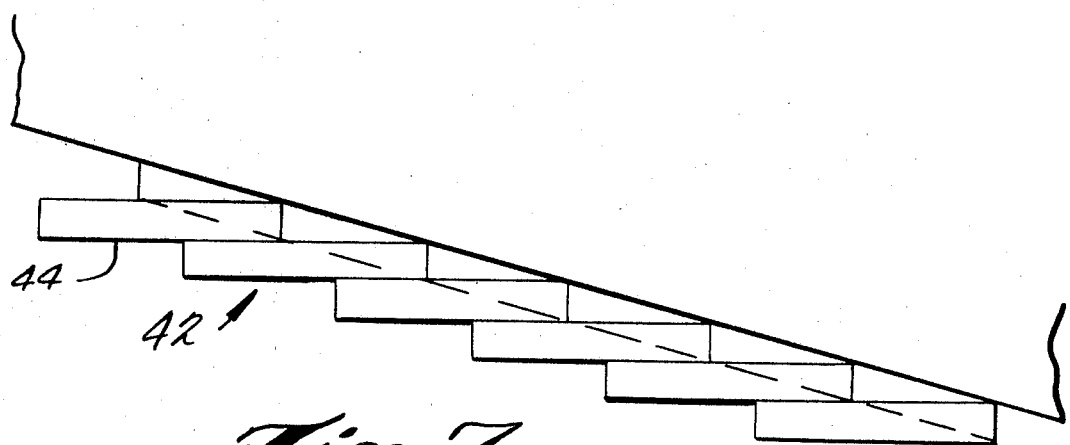
FIG. 6 is an enlarged fragmentary view of a portion of FIG. 2 showing details of the side air scoops, ducts and nozzles.

Referring now to FIGS. 1, 2 and 3 of the drawings, there is shown a speedboat having a hull 10 generally triangular in plan view. The boat is propelled by a conventional engine 12 driving a pusher air propeller 14, both being mounted atop a midline vertical stabilizer 18 at the aft end of the boat. A horizontal stabilizer 22 preferably is mounted on the vertical stabilizer 18 just below engine 12, and if desired may include controllable elevators (not shown) for pitch control. The horizontal stabilizer 22 is provided in order to counteract any undesirable tendency of the boat to be excessively elevated above the water when travelling at high speed. In the boat shown, the center of dynamic lift, other than that of the air cushion created by high speeds, is located forwardly of the stern of the boat. This dynamic lifting moment may be compensated by the horizontal stabilizer 22 and elevators if necessary, in order to maintain the craft in a horizontal position. An air rudder 24 for horizontal directional control also is mounted on the vertical stabilizer. If desired, a water rudder (not shown) depending from the aft end of the hull 10 could be coupled to the air rudder 24 in order to facilitate horizontal directional control at low speeds.

As previously described and as shown in FIGS. 2 and 3 of the drawings, the configuration of the hull 10 is generally triangular; it particularly resembles the shape of an arrowhead. Thus the bow is pointed, and the stern in plan view is in the shape of an indented V. An enclosed passenger compartment 26 which may seat two or more passengers in tandem relationship, is located toward the bow.

Turning now to FIGS. 1, 3, 4 and 5 of the drawings, it will be seen that the bottom of the hull 10 is of a multi-step construction; that is, it has a plurality of steps in order to plane rapidly and thus reduce water drag quickly. The hull bottom preferably has three V-shaped sections, the first, designated 30, extending with increasing depth from the bow to about the longitudinal midpoint and terminating in a step 32. Preferably the aft end of the section has a small generally-pointed portion 34. The other two V-shaped sections 36 are identical and laterally-spaced, each extending from a lateral extremity of the step 32 to the stern and terminating in a steep upwardly and rearwardly inclined step 38. Each section 36 also preferably terminates in a generally-pointed portion 40.

Figure 7:
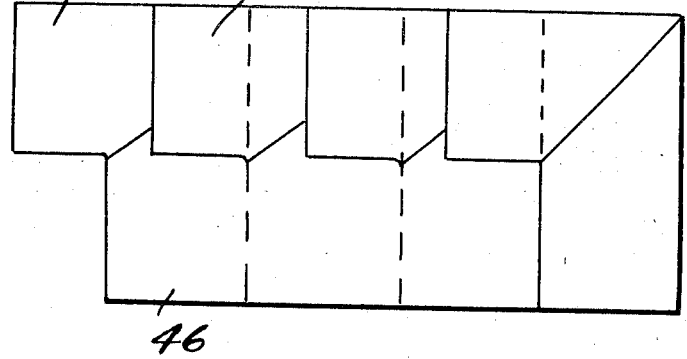
FIG. 7 is an enlarged fragmentary side view of a portion of FIG. 6.
Figure 8:
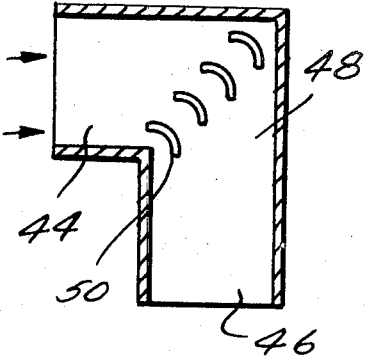
FIG. 8 is a vertical sectional view of a scoop, duct and nozzle shown in FIG. 7.
Figure 9:
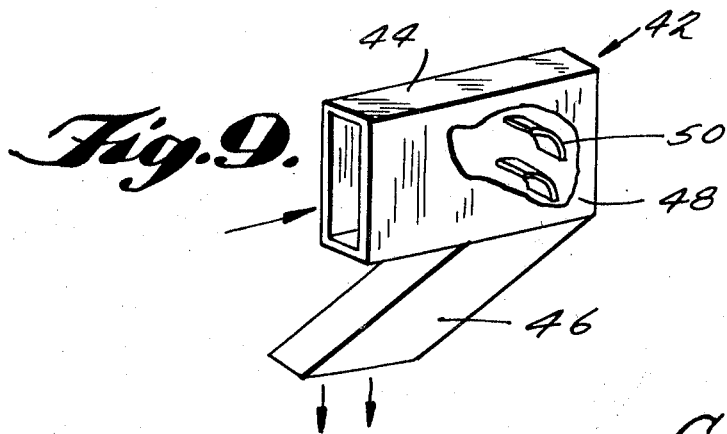
FIG. 9 is a partially-broken away perspective view of the side air scoop, duct and nozzle shown in FIG. 8.

Referring now to FIGS. 6 through 10 as well as to FIGS. 1 and 2 of the drawings, there is shown a plurality of unitary elements, generally indicated 42, arranged along the sides of the hull. Each constitutes a combined forwardly-facing air scoop or intake 44, a downwardly and inwardly extending curtain-forming nozzle 46, and a generally right angle duct 48 for directing the air from the scoop to the nozzle. Preferably curved air-directing vanes 50 are located in the elbow portion of each duct to smooth the flow of air therethrough.

Each of the side air scoops 44 is mounted approximately level with the edge of the deck 20 of the hull 10, while the elements are arranged so the nozzles 46 are closely adjacent in order that the air discharged therefrom will form a substantially unbroken curtain. The elements 42 may be made of a suitable strong, lightweight material, such as aluminum or fiber glass, and may be secured in place in any appropriate manner.

Turning now to FIG. 10 of the drawings there is shown an element 42 for creating a downwardly and inwardly directed curtain of air across the entire stern of the hull 10. The element includes an elongated horizontal air scoop or intake 44 preferably elevated a short distance, e.g. 2″, above the deck 20 to avoid the boundary layer thereon. This is done in order to ensure that the air mass is admitted into the scoop at maximum velocity.

The indented V shape of the stern portion of the hull also induces the boundary layer to flow somewhat sidewise and over the sides of the hull adjacent the stern, thus further inhibiting admission of the boundary layer into the air scoops 44.

The element 42 also includes a laterally elongated downwardly and inwardly directed curtain-forming nozzle 46 adjacent the top of the step 38, and a laterally-elongated duct 48 for directing air from the scoop to the nozzle. Preferably, flow-smoothing vanes 50 are located in the elbow portion of the duct. It also will be seen that the duct 48 may contain vertical vanes or partitions, if desired, and be made in two or more sections.

In operation, while the boat is floating in the water because of the buoyancy of its hull, it is propelled forwardly by the engine-driven propeller 14. As its speed increases the V-shaped hull sections become effective to raise the hull in the water until, at high speed, for example of the order of about 70 m.p.h., the boat begins to plane on the sections 30 and 36. At about this same speed the relative velocity of the air being scooped up through the air scoops or air intakes become sufficient so that the mass and velocity of the air being emitted from the nozzles develops a cushion of air beneath the hull at a superatmospheric pressure sufficient to lift the hull completely clear of the water, to a stable elevation, and at the same time the curtain of air being emitted from the nozzles tends to seal the cushion, i.e., to maintain its pressure above atmospheric. When the boat is thus raised above the water there is, of course, no frictional contact between the hull and the water so that the speed of the boat will increase unless its propulsion power is decreased. Once the boat is elevated above the water, the propulsion power may be decreased while maintaining substantially the same forward speed. It also will be seen that when the boat is elevated above the water surface it will give a much smoother ride because it will not be subject to impact with ripples and waves on the water surface.

It is apparent from the foregoing that the air cushion as well as the air curtain are dynamically produced. In other words, the forward motion of the speedboat is responsible for forcing or causing a mass of air to be admitted or taken in through the air scoops 44. The admitted air mass is then conveyed through the compact unobstructed ducts 48 to the nozzles 46, which direct it in the form of a curtain downwardly and inwardly under the hull 10.

Although the invention has been described with reference to a particular embodiment, it will be apparent to those skilled in the art that variations can be made.

What is claimed is:

1. A ground effect vehicle comprising:
   a body having a substantially air-tight under surface;
   power means mounted to said body for propelling the body forwardly;
   a plurality of scoop means mounted on said body for scooping up relatively moving ambient air during forward movement of said body;
   a plurality of nozzle means mounted on said body for directed jet-like curtain of air extending along at least a major portion of the periphery of said under surface, and for co-operating with said scoop means when the forward speed of said body becomes sufficient to provide a mass and velocity of air great enough to develop an air curtain sufficient by itself to produce a cushion of air beneath said under surface at a super atmospheric pressure to elevate said body at a stable elevation above the surface of the earth; and
   an unobstructed plurality of duct means connecting said scoop means and said nozzle means for conveying air scooped up by said scoop means to said nozzle means to enable said co-operation.

2. A ground effect vehicle as defined in claim in which the nozzle means extends about substantially the entire periphery of the undersurface so that the curtain is substantially endless.

3. The ground effect vehicle of claim 1 in which said scoop means are forwardly-facing and are positioned adjacent a portion of the periphery of said vehicle.

4. The ground effect vehicle of claim 1 in which said body is buoyant and of a substantially triangular configuration with a point thereof constituting the bow and said scoop means are positioned along each side and across the stern of said vehicle.

5. The ground effect vehicle of claim 4 in which that portion of said scoop means positioned across the stern of said vehicle is elevated a sufficient distance above the deck of said vehicle to preclude the admission of boundary layer air into said scoop means, for the purpose of ensuring that the air which is scooped is moving at a maximum velocity.

6. The ground effect vehicle of claim 4 in which the body undersurface has at least one step in order to plane rapidly.

7. A ground effect vehicle comprising:
a bouyant body of a substantially triangular configuration with a point thereof constituting the bow and having a substantially air-tight under surface;
power means mounted on said body for propelling the body forwardly;
scoop means positioned along each side and across the stern of said vehicle for scooping up relatively moving ambient air during forward movement of said body;
a deck member the stern portion of which is of an indented V-shape in plan view, in order to allow boundary layer air to flow away from said stern scoop means and over the sides of said vehicle;
nozzle means mounted on said body for emitting therefrom the downwardly and inwardly directed jet-like curtain of air extending along at least a portion of the periphery of said undersurface; and
unobstructed duct means for conveying air scooped up by said scoop means to said nozzle means;
whereby when the forward speed of said body becomes sufficient the mass and velocity of the curtain develop a cushion of air beneath said under surface at a super atmospheric pressure sufficient to elevate said body to a stable elevation above the surface of the earth.

8. A ground effect vehicle comprising:
a body substantially triangular in plan with a point thereof constituting the forward end of the body and having a substantially air-tight under surface;
power means mounted to said body for propelling the body forwardly;
scoop means mounted on said body for scooping up relatively moving ambient air during forward movement of said body;
nozzle means mounted to said body for emitting therefrom a downwardly and inwardly directed jet-like curtain of air extending along at least a portion of the periphery of said under surface;
unobstructed duct means for conveying air scooped up by said scoop means to said nozzle means;
a plurality of unitary elements arranged in closely adjacent relation along the sides of the body, each element including one of said scoop means, one of said nozzle means and one of said unobstructed duct means;
whereby when the forward speed of said body becomes sufficient the mass and velocity of the curtain develop a cushion of air beneath said under surface at a super atmospheric pressure sufficient to elevate said body to a stable elevation above the surface of the reath.

References Cited

UNITED STATES PATENTS

| | | | |
|---|---|---|---|
| 3,363,716 | 1/1968 | Cockerell | 180—129 X |
| 900,296 | 10/1908 | Motheral | 114—67 |
| 3,117,645 | 1/1964 | Cockerell | 180—130 X |
| 3,382,833 | 5/1968 | Wukowitz | 114—67 X |
| 3,331,347 | 7/1967 | Von Heidenstam | 114—67 |

FOREIGN PATENTS 966,530   8/1964   Great Britain.

A. HARRY LEVY, Primary Examiner

U.S. Cl. X.R.

180—122, 129; 114—67